Patented Dec. 15, 1936

2,064,258

UNITED STATES PATENT OFFICE 2,064,258

TRIPHENYLMETHANE DYESTUFFS

Hans Grotowsky, Krefeld-Uerdingen, Germany, assignor to General Aniline Works, Inc., New York, N. Y., a corporation of Delaware No Drawing. Application November 1, 1934, Serial No. 751,095. In Germany November 11, 1933

6 Claims. (Cl. 260—67)

The present invention relates to a process for the manufacture of triarylmethane dyestuffs by introducing in the customary manner during the synthesis of the dyestuffs one or more aryl radicals containing one or more alkyl sulphonic acid groups directly combined with an aromatic nucleus.

In accordance with the present invention new dyestuffs of the triarylmethane series can be obtained, possessing in the carbinol form the following general formula:

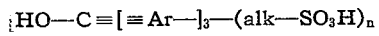

In this formula Ar represents an aromatic radical, such as for example, a phenyl- or naphthyl radical. This radical can be substituted, as is customary in the case of triarylmethane dyestuffs, thus for example by alkyl groups, such as methyl-, ethyl- and propyl groups, oxyalkyl groups, such as methoxy- and ethoxy groups, halogen atoms, such as chlorine or bromine, amino groups, substituted amino groups, such as for example, the dialkyl amino group or sulphonic acid groups and the like. In the formula "alk" represents an alkylene group, such as for example a methylene-, ethylene-, propylene- or butylene group, $n$ stands for a whole number especially for one of the numbers one to three.

The new dyestuffs are produced in accordance with the known methods for the manufacture of triphenylmethane dyestuffs. Thus, for example, an aromatic alkyl sulphonic acid can be condensed with an appropriate aldehyde to the corresponding leuco triarylmethane compound and the latter can be oxidized to the dyestuff. Another method for the manufacture of the dyestuffs consists in causing a halogen alkyl sulphonic acid to act on a dyestuff of the triarylmethane series. Finally a suitable compound of the diarylmethane series can be employed as the starting material and provided that it does not already contain the alkyl sulphonic acid group this can be introduced in accordance with the known methods prior to or after the synthesis of the triarylmethane dyestuff.

When employing leuco compounds of the triarylmethane dyestuffs as the starting material or when in the process of manufacture the new dyestuffs are obtained in the leuco form these can be converted into the dyestuffs by oxidation in the known manner.

The new dyestuffs are soluble in water, possess excellent clarity of dye shade, high dyeing power and dye fairly evenly. In the form of their alkali metal salts they are metallic lustrous powders dyeing animal fibers generally red to reddish violet to blue and green shades.

The invention is illustrated by the following examples, but is not restricted thereby; the parts being by weight:—

Example 1

326 parts by weight of tetraethyldiaminobenzhydrol are condensed in acid aqueous solution with 339 parts by weight of the sodium salt of o-sulphomethyl phenyl-taurine (produced for example by condensing 1-amino-2-sulphomethylbenzene and chlorethane sulphonic acid) and oxidizing the resulting leuco acid to the dyestuff in the customary manner by means of lead peroxide. The dyestuff is salted out as the sodium salt from the dyestuff solution after removing lead sulphate. A dyestuff is obtained of very pure reddish violet shade and high dyeing power, which in the carbinol form corresponds to the following formula:

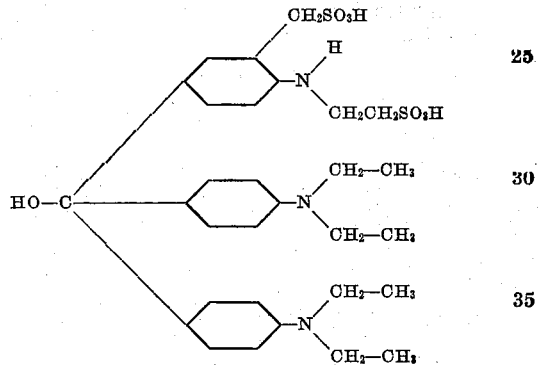

Example 2

310 parts by weight of 1.2-xylyl-ω-ω-disulphonic acid (produced from 1.2-dichloromethylbenzene by means of sodium sulphite) are well mixed with 326 parts by weight of tetraethyldiaminobenzhydrol and introduced with stirring into 2000 parts by weight of concentrated sulphuric acid. The mixture is stirred at 90° C. until a test portion no longer shows the hydrol reaction by means of sodium acetate and glacial acetic acid. The melt is poured on to ice water and the leuco acid then precipitated by the addition of caustic soda lye. The leuco acid is oxidized in the known manner by means of lead peroxide or lead bichromate. Common salt precipitates the dyestuff from the solution in the form of small iridescent golden leaves. A very clear, yellowish green coloration is obtained on dyeing wool. The dyestuff, in addition to possessing a very good fastness to light for a triphenylmethane dyestuff, also dyes very evenly. In the carbinol form it corresponds to the following formula:

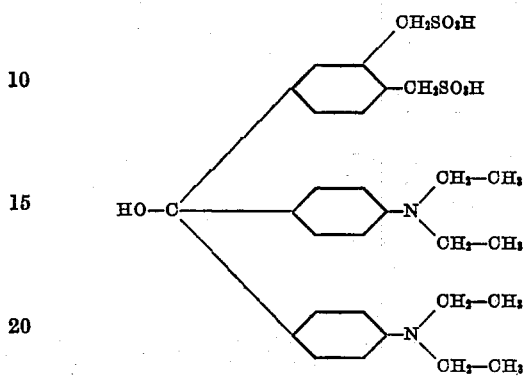

Example 3

208 parts by weight of the sodium salt of β-sulphoethylbenzene (produced from β-chloroethylbenzene and sodium sulphite) are dissolved in 2000 parts by weight of concentrated sulphuric acid. This solution is mixed while stirring in the course of half an hour with 270 parts by weight of tetramethyldiaminobenzhydrol (100%). Stirring is carried out first at room temperature and then at water bath temperature until the hydrol is completely converted. The melt is then poured on to ice water and the leuco acid precipitated by neutralizing the sulphuric acid by means of caustic soda lye. The leuco acid is then oxidized by means of lead peroxide in sulphuric acid solution. From the solution, after removal of lead sulphate, the dyestuff is obtained as a lustrous red resin by salting out with sulphate and careful addition of alkali. Dyed on wool the dyestuff yields a greenish shade. In the carbinol form it corresponds to the following formula:

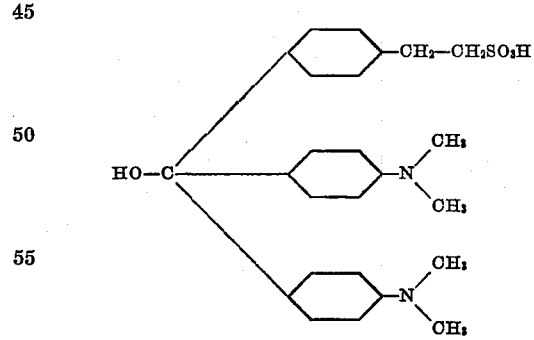

Example 4

554 parts by weight of o-monobenzylaminobenzyl-ω-sulphonic acid (produced by benzylating o-aminobenzyl-ω-sulphonic acid) are heated to boiling with stirring for 24 hours with 140 parts by weight of o-chlorobenzaldehyde and 250 parts of water. The resulting leuco acid is obtained in the crystalline state by dissolving in aqueous alkali, filtering from small amounts of impurities and precipitating with sulphuric acid. The acid is then oxidized in the customary manner, for example, by means of lead peroxide and the dyestuff separated as a red crystalline powder by the addition of common salt to the solution after the removal of lead sulphate. Dyed on wool the dyestuff yields a blueish green shade. In the carbinol form it corresponds to the following formula:

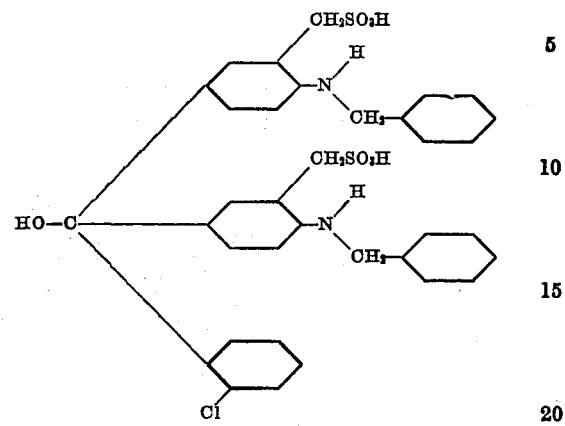

1. Triarylmethane dyestuffs having in the carbinol form the general formula:

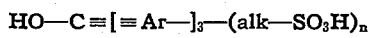

wherein "Ar" stands for an aromatic radical at least two of which contain an auxochrome, "alk" represents an alkylene group and "$n$" stands for one or two, these dyestuffs being in the form of their alkali metal salts dark metallic lustrous powders.

2. Triarylmethane dyestuffs having in the carbinol form the general formula:

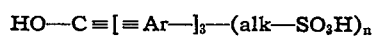

wherein "Ar" is a radical selected from the class consisting of phenyl and naphthyl radicals at least two of which contain an auxochrome, "alk" represents an alkylene group and "$n$" stands for one or two, these dyestuffs being in the form of their alkali metal salts dark metallic lustrous powders.

3. Triarylmethane dyestuffs having in the carbinol form the general formula:

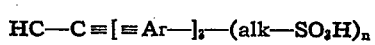

wherein "Ar" stands for a phenyl radical at least two of which contain an auxochrome, "alk" is a radical selected from the class consisting of methylene and ethylene radicals and "$n$" stands for one or two, these dyestuffs being in the form of their alkali metal salts dark metallic lustrous powders.

4. The triarylmethane dyestuff having in the carbinol form the following formula:

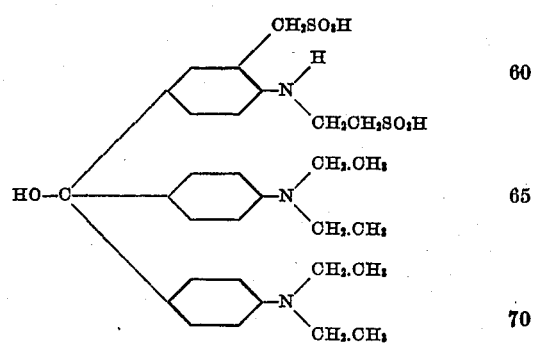

dyeing wool in reddish violet shades.

5. The triarylmethane dyestuff having in the carbinol form the following formula:

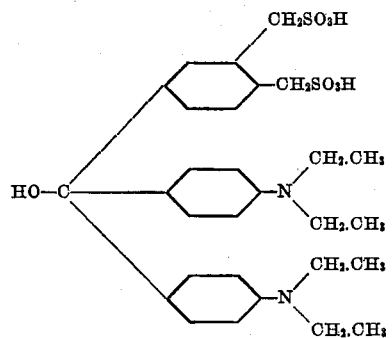
dyeing wool in yellowish green shades.
6. The triarylmethane dyestuff having in the carbinol form the following formula:
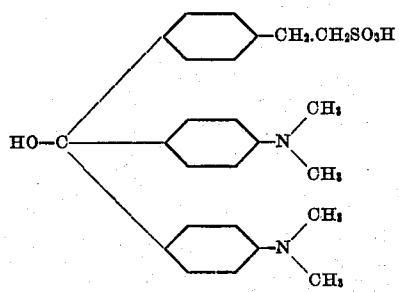
dyeing wool in greenish shades.
HANS GROTOWSKY.